United States Patent Office 3,511,763
Patented May 12, 1970

3,511,763
PROCESS FOR THE PRODUCTION OF HALOGEN-CONTAINING DIOXENE- AND α-KETO-OXE-TANE DERIVATIVES
Carl Heinrich Krauch, Samir Farid, and Dieter Hess, Mulheim (Ruhr), Germany, assignors to Kalle A.G., Wiesbaden-Biebrich, Germany, a corporation of Germany
No Drawing. Filed Nov. 16, 1966, Ser. No. 594,699
Claims priority, application Germany, July 30, 1966, St 25,703
Int. Cl. B01j 1/10
U.S. Cl. 204—158                      10 Claims

ABSTRACT OF THE DISCLOSURE

Process of preparing halogen containing dioxene- and α-keto-oxetane derivatives having the formulae:

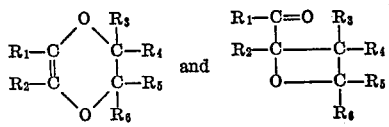

wherein $R_1$ and $R_2$ each represent one of hydrogen, alkyl, aryl and aralkyl and wherein $R_1$ and $R_2$ may be joined together with the carbon atoms to which they are attached to form an unsaturated monocyclic or polycyclic ring system, with the proviso that only one of $R_1$ and $R_2$ can simultaneously be hydrogen, and $R_3$, $R_4$, $R_5$ and $R_6$ each represent one of hydrogen, halogen, alkyl, aryl and aralkyl and wherein any two of $R_3$–$R_6$ may be joined together with the carbon atoms to which they are attached to form a monocyclic or polycyclic ring system, with the proviso that at least one of $R_3$–$R_6$ is halogen, which comprises reacting a dicarbonyl compound having the formula:

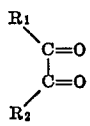

with an olefinically unsaturated compound having the formula:

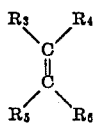

wherein $R_1$, $R_2$, $R_3$, $R_4$, $R_5$ and $R_6$ are as above defined, while irradiating light into the first absorption bands of the carbonyl compound, the irradiation being effected with light which will not be absorbed by the reaction product.

---

This invention relates to a process for the production of halogen-containing dioxene- and α-keto-oxetane derivatives.

It is known that oxetanes are obtained in good yields by reacting a perfluorinated monocarbonyl compound with ethylene, vinyl fluoride or vinylidene fluoride under the action of actinic radiation. For example, two isomeric oxetanes of the formulae

are obtained as the reaction product of hexafluoroacetone

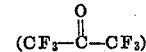

and vinyl fluoride ($CH_2=CHF$). It is also known that the photoreaction of phenanthrenequinone-9,10 with benzocyclic olefins may proceed with both 1,2-addition to only one carbonyl group to form alpha ketooxetanes and 1,4-addition to both carbonyl groups to form phenanthrodioxenes.

However, it is also known that if olefins carrying a halogen atom at one of the carbon atoms from which the double bond extends are used, this photoreaction gives dioxynes rather than dioxenes.

For example, phenanthrene quinone and chlorostilbene give a phenanthro[9,10-b][1,4]-dioxyne when irradiated with solar light for six months in a benzene solution. This reaction can be represented by the following equation:

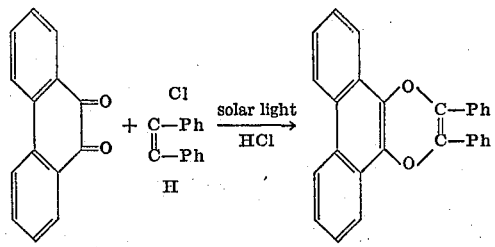

While the assumption has been made so far that the reaction shown above would proceed via an intermediate product of the formula

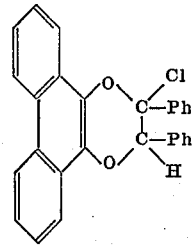

it was not possible up to the present to intercept this intermediate compound.

It is an object of the present invention to provide a process which permits the production of halogen-substituted dioxene- and alpha keto-oxetanes in a simple manner. Accordingly, the present invention relates to a process for the production of halogen-containing dioxene- and alpha keto-oxetane derivatives of the general formulae

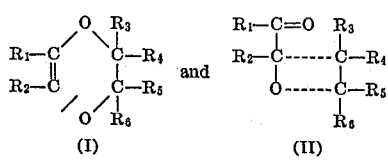

(I)        (II)

rein $R_1$ and $R_2$ are hydrogen, substituted or unsubted alkyl, cycloalkyl, aryl, aralkyl or heteroyl and be joined to form a saturated or unsaturated, subted or unsubstituted ring and $R_3$, $R_4$, $R_5$ and $R_6$ are gen, substituted or unsubstituted alkyl, cycloalkyl, , aralkyl or heteroyl, at least one of the groups $R_3$, $R_5$ and $R_6$ being halogen and two of the radicals $R_4$, $R_5$ and $R_6$ may be joined to form a saturated unsaturated, substituted or unsubstituted ring, the ess comprising reacting a dicarbonyl compound of the ral formula $$R_1-C=O$$
$$R_2-C=O$$

rein $R_1$ and $R_2$ are as defined above with an olefini- unsaturated compound of the general formula

ein $R_3$, $R_4$, $R_5$, and $R_6$ are as defined above while liating light into the prebands of the carbonyl comid, said irradiation being effected through a light which does not transmit light which would be abed by the product being formed.

has been found in accordance with the invention the compounds prepared by the process of the inion are generally extremely sensitive to light having lengths of below 370 millimicrons and undergo mposition with monomolecular cleavage of two subents, e.g. with formation of hydrohalic acid. This rising fact which could not be predicted is the reawhy it was previously impossible to isolate the interiate compound assumed to exist when reacting anthrenequinone with chlorostilbene.

hen carrying out the process of the invention, a soluof the components is irradiated in such a manner only the first absorption band of the 1,2-dicarbonyl pound is stimulated, e.g. with light of wave lengths e 400 millimicrons. When using usual light sources as mercury high pressure burners, xenon high presburners or solar light, it is necessary, therefore, to a light filter which prevents irradiation with light h is absorbed by the adduct being formed. An exam)f a suitable light filter is a WG glass of Glaswerke theim which does not transmit light of wave lengths w 370 millimicrons. Of course, it is possible to use sources which directly emit light of the wave length ed so that a light filter is not necessary for these sources.

le use of a specific solvent is not critical, preferred g aromatic solvents, especially benzene.

he formation of the reaction products (I) and (II) be accompanied by the formation of the by-products ) and (IV) having the following general formulae:

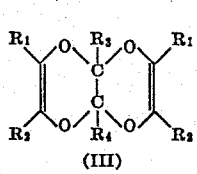 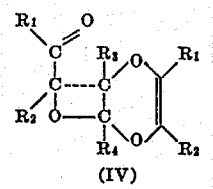

(III)        (IV)

ein $R_1$, $R_2$, $R_3$, and $R_4$ are as defined above. To mize the formation of these by-products (III) and ), it is recommended to operate at temperatures h are as low as possible although the reaction temture is not critical. For example, temperatures ben $-80°$ and $+80°$ C. and preferably between $0°$ C. room temperature are used.

Examples of 1,2-dicarbonyl compounds which may be used as the starting materials for the process of the invention include

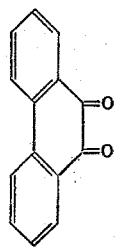 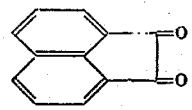

Examples of halogen-containing olefins which may be used as starting materials in the process of the invention include compounds of the formulae

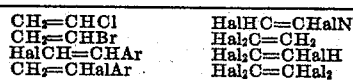

| | |
|---|---|
| $CH_2=CHCl$ | $HalHC=CHalN$ |
| $CH_2=CHBr$ | $Hal_2C=CH_2$ |
| $HalCH=CHAr$ | $Hal_2C=CHalH$ |
| $CH_2=CHalAr$ | $Hal_2C=CHal_2$ |
| $ArCH=CHalEr$ | |

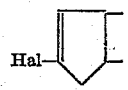

wherein Ar is aryl and Hal is halogen.

As is obvious from the above statements, the compounds falling under the invention are formed under the action of longwave light while they undergo decomposition when irradiated with light having a wave length of, for example, below 370 millimicrons.

The compounds prepared by the process of the invention owe to the finding of this fact not only their preparation but also their uses. Thus, the compounds prepared in accordance with the invention as suitable as both polymerization catalysts and plant protectives or pesticides. Another application which is also based on the specific sensitivity to light is the use of the products of the invention as initiators in all processes which deal with photosensitive layers, e.g. in the repro process.

The following examples are given by way of illustration and not limitation.

EXAMPLE 1

Photoaddition of phenanthrenequinone-(9,10) to vinyl chloride

This experiment gives the following products:

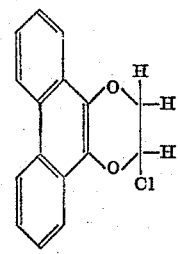

(I)

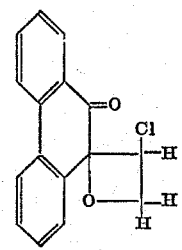

(II)

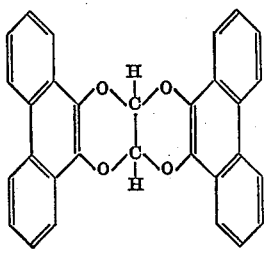

(III)

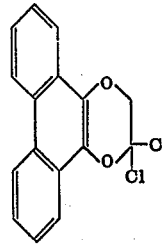

(1) $C_{16}H_{10}Cl_2O_2$ (305.2). Calc.: C, 62.96; H, 3.30; Cl, 23.24. Found: C, 63.56; H, 3.39; Cl, 22.58. Molecular weight, 303 (osmotic pressure method in benzene).

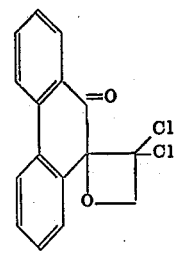

(2) $C_{16}H_{10}Cl_2O_2$ (305.2). Calc.: C, 62.96; H, 3.30; Cl, 23.24. Found: C, 63.33; H, 3.18; Cl, 21.93. M.W. 304 (osmotic pressure method in benzene).

(IV)

Vinyl chloride was introduced into a suspension of phenanthrenequinone (1.04 g., 5 mmoles) in benzene (70 ml.) at −15° C. until the suspension was saturated (increase in volume to 110 ml.). After irradiation for 1.6 hours with light having a wave length of above 385 millimicrons at about −10° C., the phenanthrenequinone was dissolved and the solution was only weakly yellow. The solvent was removed and the residue was mixed with 30 ml. of ether and briefly boiled to separate 190 mg. of the product of the Formula III having almost the theoretical melting point. Evaporation of the ether and subsequent chromatography on Florisil with petroleum ether (60 to 80° C.) gave first 420 mg. of the product of the Formula I and then, with petroleum ether/cyclohexane, additional 220 mg. of (III) (a total of 410 mg.). The products (II) and (IV) could only be eluated with benzene/chloroform. After boiling with 15–20 ml. of ethanol, 22 mg. of (IV) remained undissolved. 280 milligrams of (II) could be recovered from the solution. After recrystallization, the substances were colorless.

EXAMPLE 3

Photoaddition of phenanthrenequinone to 2-chloroindene

A solution is prepared from 1.04 g. (5 millimoles) of phenanthrenequinone and 3.01 g. (20 millimoles) of 2-chloroindene in 100 ml. of benzene. This solution is irradiated for 1 hour with the use of a filter glass which does not transmit light of wave lengths above 27,000/cm. After the irradiation, the benzene is distilled off and the residue obtained is subjected to chromatography on Florisil. Elution with cyclohexane/benzene gives 140 mg of the product of the Formula 1 which after recrystallization from a mixture of ethanol and benzene has a melting point of 213–215° F. Elution with benzene/chloroform gives 740 mg. of the product (2) which after recrystallization from dioxane/water has a melting point of 169–172° C.

(1) $C_{23}H_{14}O_2$ (322.4). Molecular weight, 318 (osmotic pressure method in benzene).

ADDUCTS (I) TO (IV) PREPARED

| Adduct of formula | Yield, percent | Recrystallized from— | Empirical formula, melting point, ° C. | Molecular weight [1] | Analysis | | |
|---|---|---|---|---|---|---|---|
| | | | | | C | H | Cl |
| I | 31 | Petroleum ether (100–140° C.) | $C_{16}H_{11}O_2Cl$, 168–170° C | Calculated, 270.7; found, 278. | 71.00 / 71.47 | 4.10 / 3.97 | 13.08 / 12.73 |
| II | 21 | Ethanol | $C_{16}H_{11}O_2Cl$, 144–145° C.[2] | Calculated, 270.7; found, 271. | 71.00 / 70.95 | 4.10 / 4.06 | 13.08 / 12.96 |
| III | 37 | Xylene | $C_{30}H_{18}O_4$, 348–349° C | Calculated, 442.5; found, 414. | 81.44 / 81.85 | 4.10 / 4.25 | |
| IV | 2 | Dimethyl formamide | $C_{30}H_{18}O_4$, 278–279° C.[3] | Calculated, 442.5; found, 464. | 81.44 / 81.53 | 4.10 / 4.04 | |

[1] Osmotic pressure method.
[2] Above 190° C., decomposition with the color turning to green.
[3] With decomposition.

EXAMPLE 2

Photoaddition of phenanthrenequinone to vinylidene chloride

A solution of 2.08 g. of phenanthrenequinone and 20 ml. of vinylidene chloride in 150 ml. of benzene is prepared and irradiated for 6 hours with the use of a filter glass which does not transmit light of wave lengths above 27,000/cm. The benzene is then distilled off and the residue subjected to chromatography on Florisil. Elution with petroleum ether gives 220 mg. of the compound referred to hereafter as (1) and having a melting point of 131–133° C. The petroleum ether used has a boiling point of between 100 and 140° C. Subsequent elution with benzene/chloroform gives 1.1 g. of an impure product of the Formula 2 shown below. Recrystallization from petroleum ether (boiling range, 100 to 140° C.) gives yellowish crystals having a melting point of 104 to 107° C.

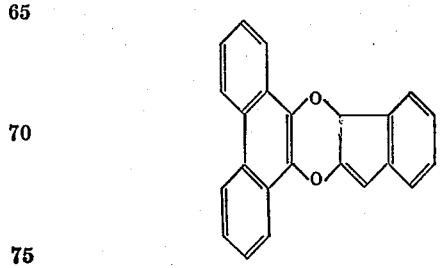

2) C₃₃H₁₅ClO₂ (358.8). Calc.: C, 76.99; H, 4.22; Cl, Found: C, 77.25; H, 4.16; Cl, 10.04. M.W. 339 notic pressure method in benzene).

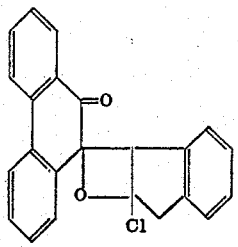

That is claimed is:
Process of preparing halogen containing dioxene-α-keto-oxetane derivatives having the formulae:

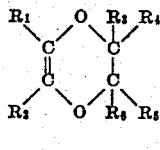 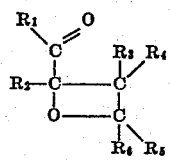

rein R₁ and R₂ each represent one of hydrogen, alkyl, and aralkyl and wherein R₁ and R₂ may be joined ther with the carbon atoms to which they are attached rm an unsaturated monocyclic or polycyclic ring system, with the proviso that only one of R₁ and R₂ can iltaneously be hydrogen, and R₃, R₄, R₅ and R₆ each esent one of hydrogen, halogen, alkyl, aryl and aral- and wherein any two of R₃–R₆ may be joined together the carbon atoms to which they are attached to form onocyclic or polycyclic ring system, with the proviso at least one of R₃–R₆ is halogen, which comprises ting a dicarbonyl compound having the formula:

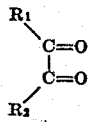

an olefinically unsaturated compound having the ıula:

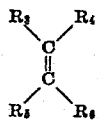

ein R₁, R₂, R₃, R₄, R₅ and R₆ are as above defined, e irradiating light into the first absorption bands of carbonyl compound, the irradiation being effected light which will not be absorbed by the reaction uct.

Process according to claim 1 wherein said irradia- is effected with light having a wave length of 400

Process according to claim 1 wherein said irradia- is effected using a light filter which does not transmit as would be absorbed by the reaction product.

Process according to claim 1 which comprises effect- said reaction in the presence of a solvent.

Process according to claim 1 which comprises effecting said reaction at a temperature of from −80 to +80° C.

6. Process according to claim 1 wherein said dicarbonyl compound is a member selected from the group consisting of

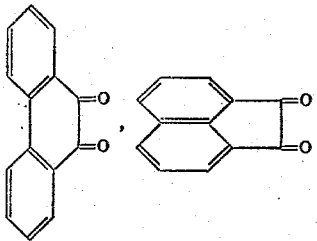

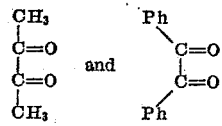

7. Process according to claim 1 wherein said olefinically unsaturated compound is a member selected from the group consisting of $$CH_2=CHCl,$$
$$CH_2=CHBr,$$
$$HalCH=CHAr,$$
$$CH_2=CHalAr,$$
$$ArCH=CHalAr,$$
$$HalHC=CHalH,$$
$$Hal_2C=CH_2,$$
$$Hal_2C=CHalH,$$
$$Hal_2C=CHal_2,$$

and

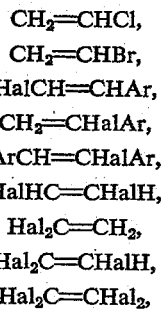

8. Process according to claim 1 wherein said carbonyl compound is phenanthrenequinone-(9,10) and said olefinically unsaturated compound is vinylchloride.

9. Process according to claim 1 wherein said carbonyl compound is phenanthrenequinone and said olefinically unsaturated compound is vinylidene chloride.

10. Process according to claim 1 wherein said carbonyl compound is phenantrenequinone and said olefinically unsaturated compound is 2-chloroindene.

References Cited

Schonberg et al.: Chemical Reviews, vol. 40 (1947), pp. 181, 190, 193, 195 and 196.

HOWARD S. WILLIAMS, Primary Examiner

U.S. Cl. X.R.

260—340.6

UNITED STATES PATENT OFFICE
CERTIFICATE OF CORRECTION

Patent No. 3,511,763    Dated May 12, 1970

Inventor(s) Carl Heinrich Krauch, Samir Farid and Dieter Hess

It is certified that error appears in the above-identified patent and that said Letters Patent are hereby corrected as shown below:

Column 2, Formula I at bottom of page

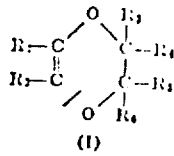  should be  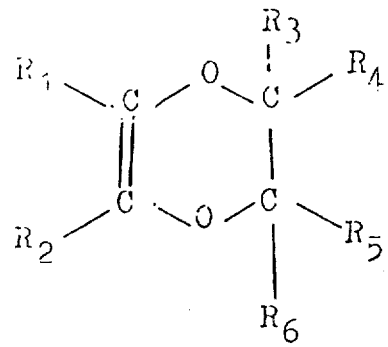

Column 7, line 1, "$C_{33}$" should be -- $C_{23}$ --.

SIGNED AND SEALED
JAN 12 1971

[SEAL]
Attest:

Edward M. Fletcher, Jr.
Attesting Officer

WILLIAM E. SCHUYLER, JR.
Commissioner of Patents